United States Patent

Fitzpatrick-Ellis et al.

[11] Patent Number: 6,059,082
[45] Date of Patent: May 9, 2000

[54] POWER TRANSMITTING ARRANGEMENT

[75] Inventors: John Francis Fitzpatrick-Ellis, Warwick; Alastair John Young, Kenilworth, both of United Kingdom

[73] Assignee: Automotive Products, PLC, Leamington SPA, United Kingdom

[21] Appl. No.: 09/125,251
[22] PCT Filed: Feb. 10, 1997
[86] PCT No.: PCT/GB97/00362
  § 371 Date: Aug. 14, 1998
  § 102(e) Date: Aug. 14, 1998
[87] PCT Pub. No.: WO97/30302
  PCT Pub. Date: Aug. 21, 1997

[30] Foreign Application Priority Data

Feb. 16, 1996 [GB] United Kingdom .................. 9603269

[51] Int. Cl.$^7$ ................................................. F16D 33/00
[52] U.S. Cl. ........................ 192/3.29; 192/3.28; 192/3.3
[58] Field of Search ................................. 192/3.29, 3.28, 192/3.3, 3.31

[56] References Cited

U.S. PATENT DOCUMENTS

| | | | |
|---|---|---|---|
| 4,291,790 | 9/1981 | Staub, Jr. | 192/3.28 |
| 5,746,296 | 5/1998 | Wirtz | 192/3.29 |

*Primary Examiner*—Charles A. Marmor
*Assistant Examiner*—Tisha D. Daddell
*Attorney, Agent, or Firm*—Paul E. Milliken; Ray L. Weber; Lee A. Germain

[57] ABSTRACT

A power transmitting arrangement comprising a fluid coupling and, connected in parallel with the fluid coupling, a series arrangement of a clutch and at least one linkage arrangement (40), and upon engagement of the clutch the series arrangement directly connecting the fluid coupling input to the fluid coupling output. The linkage arrangement comprising at least an anchor link (42) mounted via a pivot (50) to the linkage arrangement input, a main link (41) mounted via a pivot to the linkage arrangement output (70). The anchor link and main link being connected together via a pivot so (60) that the linkage arrangement controls the relative rotation of the input and output of the power transmitting arrangement, when the clutch is engaged, as a result of centripetal forces acting on the links.

33 Claims, 6 Drawing Sheets

POWER TRANSMITTING ARRANGEMENT

The present invention relates to a power transmitting arrangement comprising a fluid coupling and more particularly but not exclusively relates to a fluid coupling such as a hydraulic torque convertor or a fottinger clutch or the like used in a vehicle transmission assembly.

Power transmitting arrangements are known in which a fluid coupling transmits power from the crankshaft of an engine via an impeller and a turbine to the input shaft of a gearbox. Under certain conditions the turbine can rotate slower than the impeller i.e. the fluid coupling slips. In such arrangements it is also known to prevent coupling slip by providing a parallel path for the transmission of power from the crankshaft to the input shaft of the gearbox via an engageable lock-up clutch. The clutch is designed to engage at pre-selected speeds, dependant upon the working conditions of the vehicle, and ensures that the engine crankshaft and gearbox input shaft rotate at essentially the same speed and no slip occurs.

It is an object of the present invention to provide an improved form of a power transmitting arrangement which includes a lock-up clutch.

According to the present invention there is provided a power transmitting arrangement comprising a fluid coupling and, connected in parallel with the fluid coupling, a series arrangement of a clutch and at least one linkage arrangement, the fluid coupling, linkage arrangement and clutch each having respective input and output means, and upon engagement of the clutch the series arrangement directly connecting the fluid coupling input means to the fluid coupling output means, the or each linkage arrangement comprising at least an anchor link mounted via a pivot to one of the linkage arrangement input or output means and a main link mounted via a pivot to the other of the linkage arrangement input or output means, the anchor link and main link being connected together via a pivot so that the linkage arrangement controls the relative rotation of the input and output means of the power transmitting arrangment, when the clutch is engaged, as a result of centripetal forces acting on the links, and the linkage arrangement also including a controlling means for further control of the relative rotation between input and output means of the power transmitting arrangement.

According to a further aspect of the invention there is provided a power transmitting arrangement comprising a fluid coupling and, connected in parallel with the fluid coupling, a series arrangement of a clutch and at least one linkage arrangement, the fluid coupling, linkage arrangement and clutch each having respective input and output means, and upon engagement of the clutch the series arrangement directly connecting the fluid coupling input means to the fluid coupling output means, the or each linkage arrangement comprising an anchor link mounted via a pivot to one of the linkage arrangement input means or output means and a multi-link linkage having two or more circumferentially spaced main links mounted via respective pivots to the other of the linkage arrangement input means or output means with each main link of the or each circumferentially adjacent pair of main links being connected via a pivot to a generally circumferentially extending connecting linkage, the multi-link linkage being connected via at least one pivot with the anchor link, so that the linkage arrangement controls the relative rotation of the input and output means of the power transmitting arrangement when the clutch is engaged, as a result of centripetal forces on the links.

According to a further aspect of the invention there is provided a power transmitting arrangement comprising a series arrangement of at least one linkage arrangement and a fluid coupling, all having respective input and output means, the or each linkage arrangement comprising at least an anchor link mounted via a pivot to one of the linkage arrangement input or output means and a main link mounted via a pivot to the other of the linkage arrangement input or output means, the anchor link and main link being connected together via a pivot, the power transmitting arrangement further comprising an engageable clutch having input and output means connected to the fluid coupling input and output means respectively so that with the clutch engaged no slip occurs between the fluid coupling input and output means and the linkage arrangement controls relative rotation between the input and output means of the power transmitting arrangement as a result of centripetal forces acting on the links.

According to yet a further aspect of the present invention there is provided a power transmitting arrangement comprising a series arrangement of at least one linkage arrangement and a fluid coupling all having respective input and output means, the or each linkage arrangement comprising an anchor link mounted via a pivot to one of the linkage arrangement input or output means and a multi link linkage having two or more circumferentially spaced main links each mounted via respective pivots to the other of the linkage arrangment input or output means with each main link of the or each circumferentially adjacent pair of main links being connected via a pivot to a generally circumferentially extending connecting linkage, the multi-link linkage being connected via at least one pivot with the anchor link, the power transmitting arrangement further comprising an engageable clutch having input and output means connected to the fluid coupling input and output means respectively so that with the clutch engaged no slip occurs between the fluid coupling input and output means and the linkage arrangement controls relative rotation between the input and output means of the power transmitting arrangement as a result of centripetal forces acting on the links.

For a better understanding of the present invention and to show more clearly how it may be carried into effect reference will now be made, by way of example only, to the accompanying drawings in which.

Figure 1:
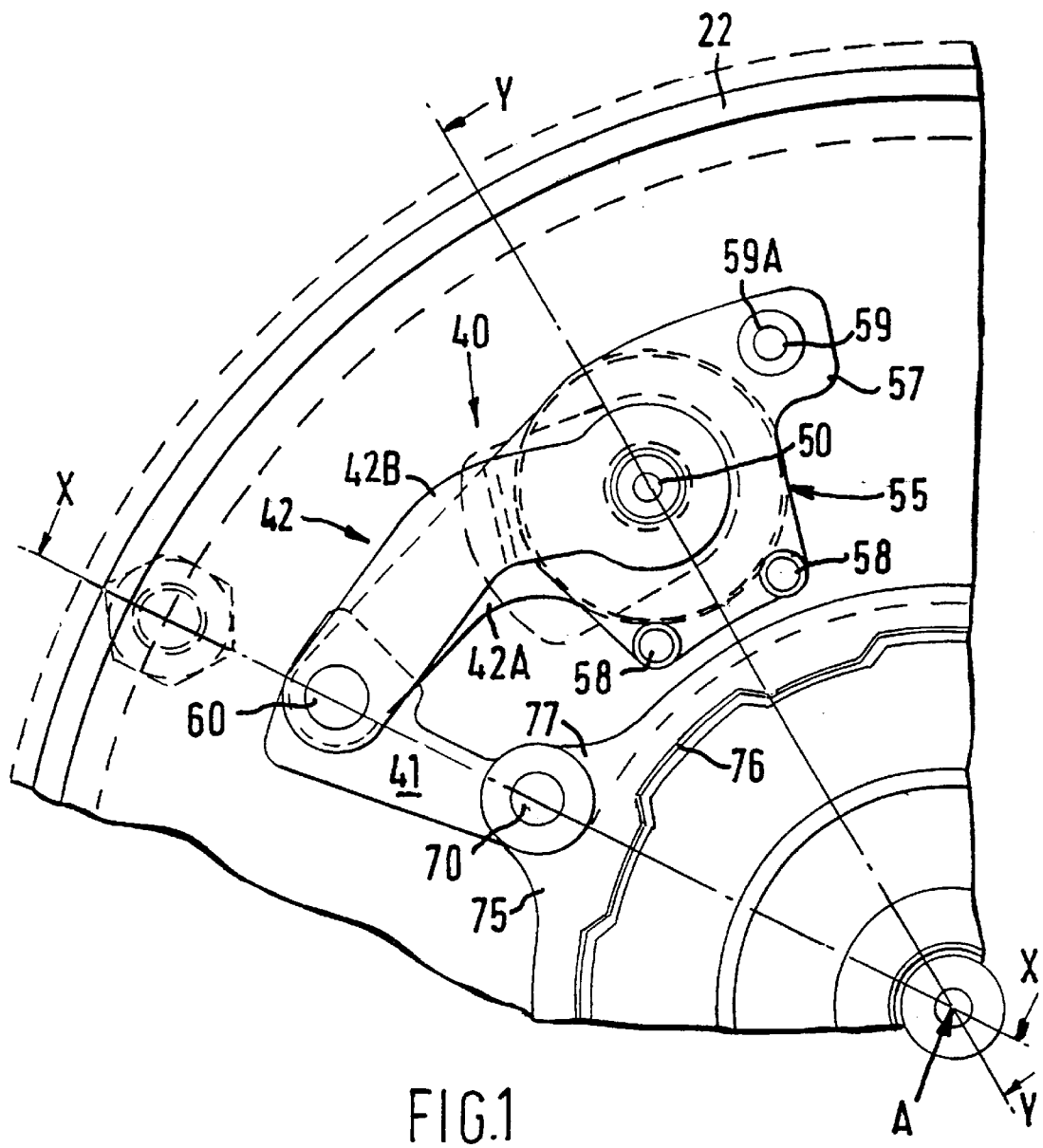
FIG. 1 is an axial view of a power transmitting arrangement looking towards an associated gearbox.
Figure 4:
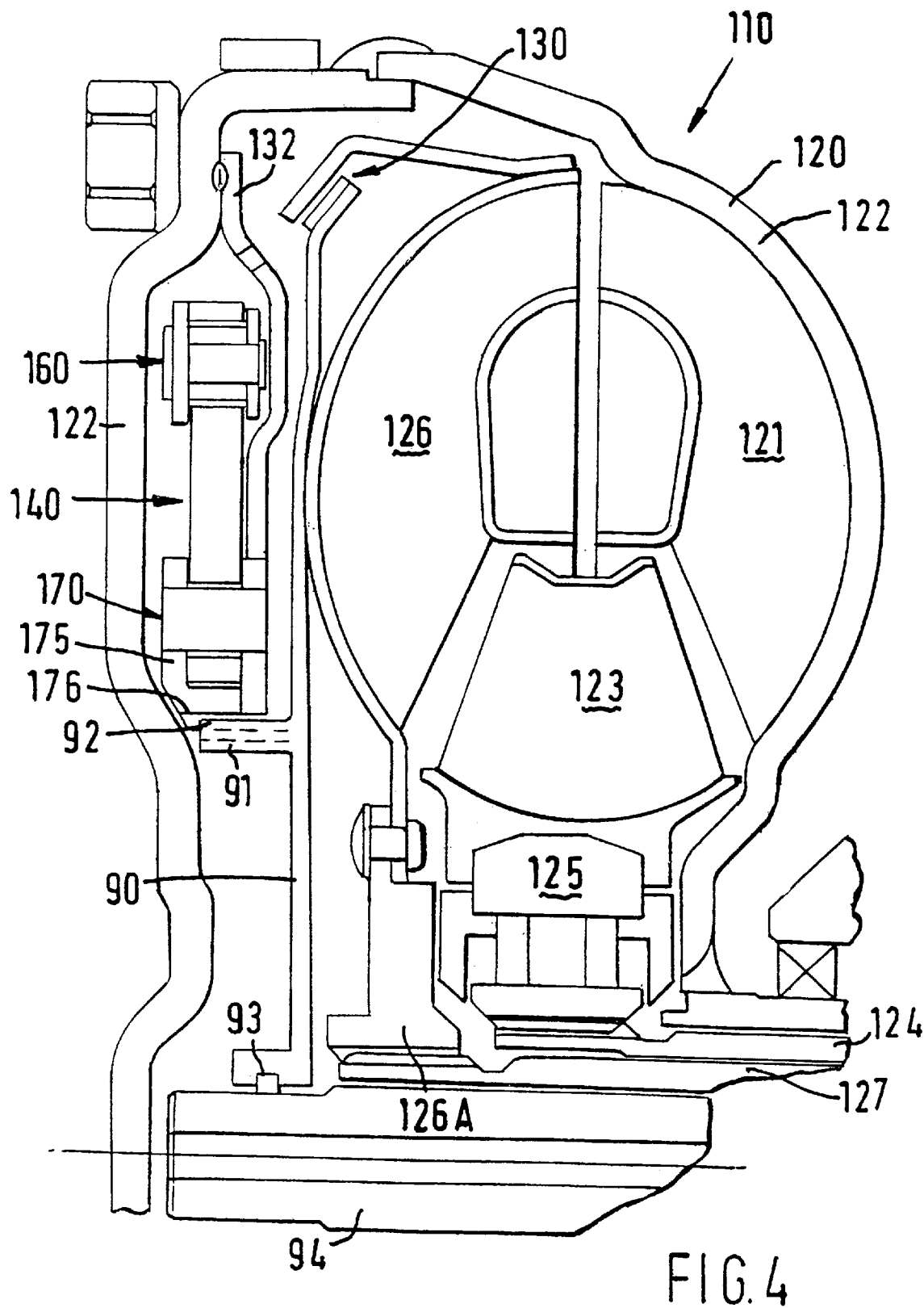
FIG. 4 shows a view similar to FIG. 2 of an alternative embodiment of a power transmitting arrangement according to the present invention.
Figure 7:
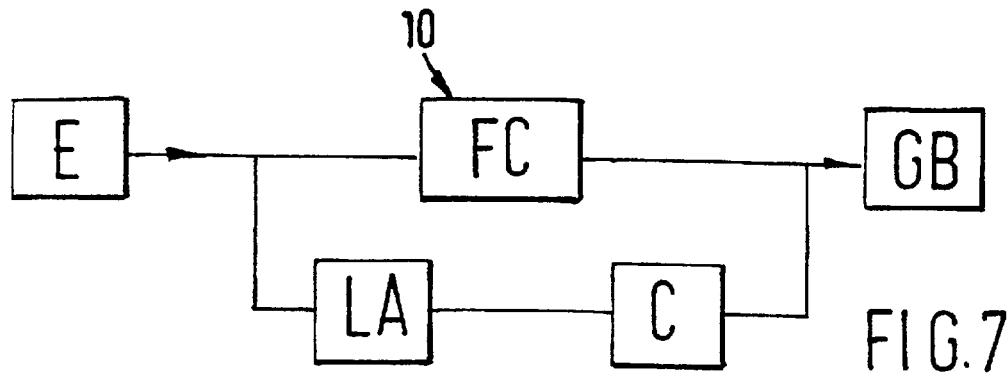
Figure 8:
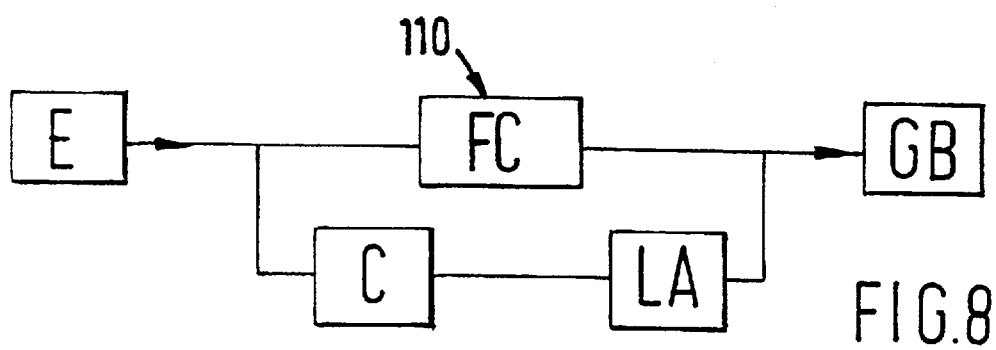
Figure 9:
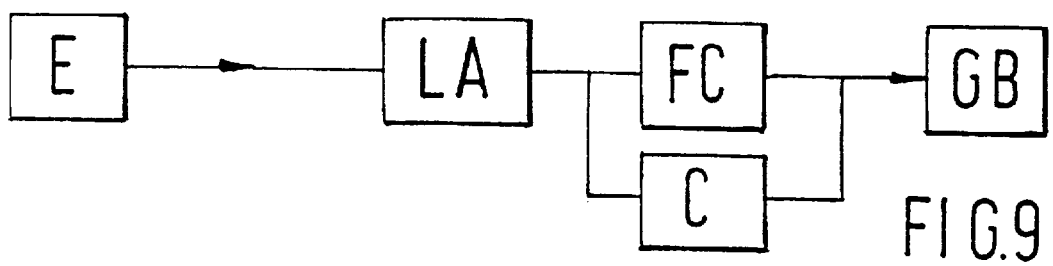
Figure 10:
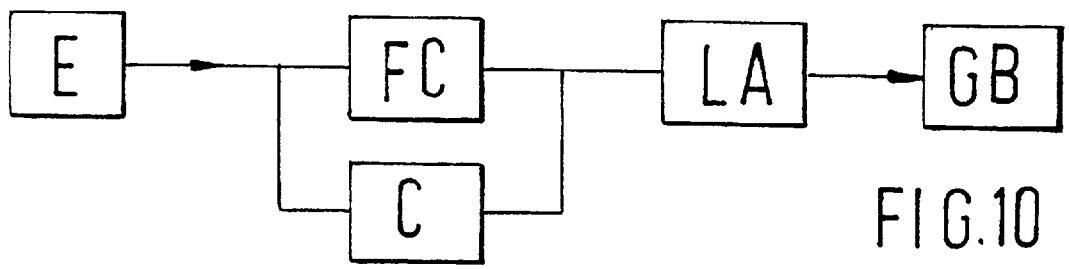

FIGS. 7 and 8 show the diagrammatic representations of the power transmitting arrangements of FIGS. 1 and 4 respectively, and FIGS. 9 and 10 show a further diagrammatic representation of power transmitting arrangements according to the present invention.

Figure 2:
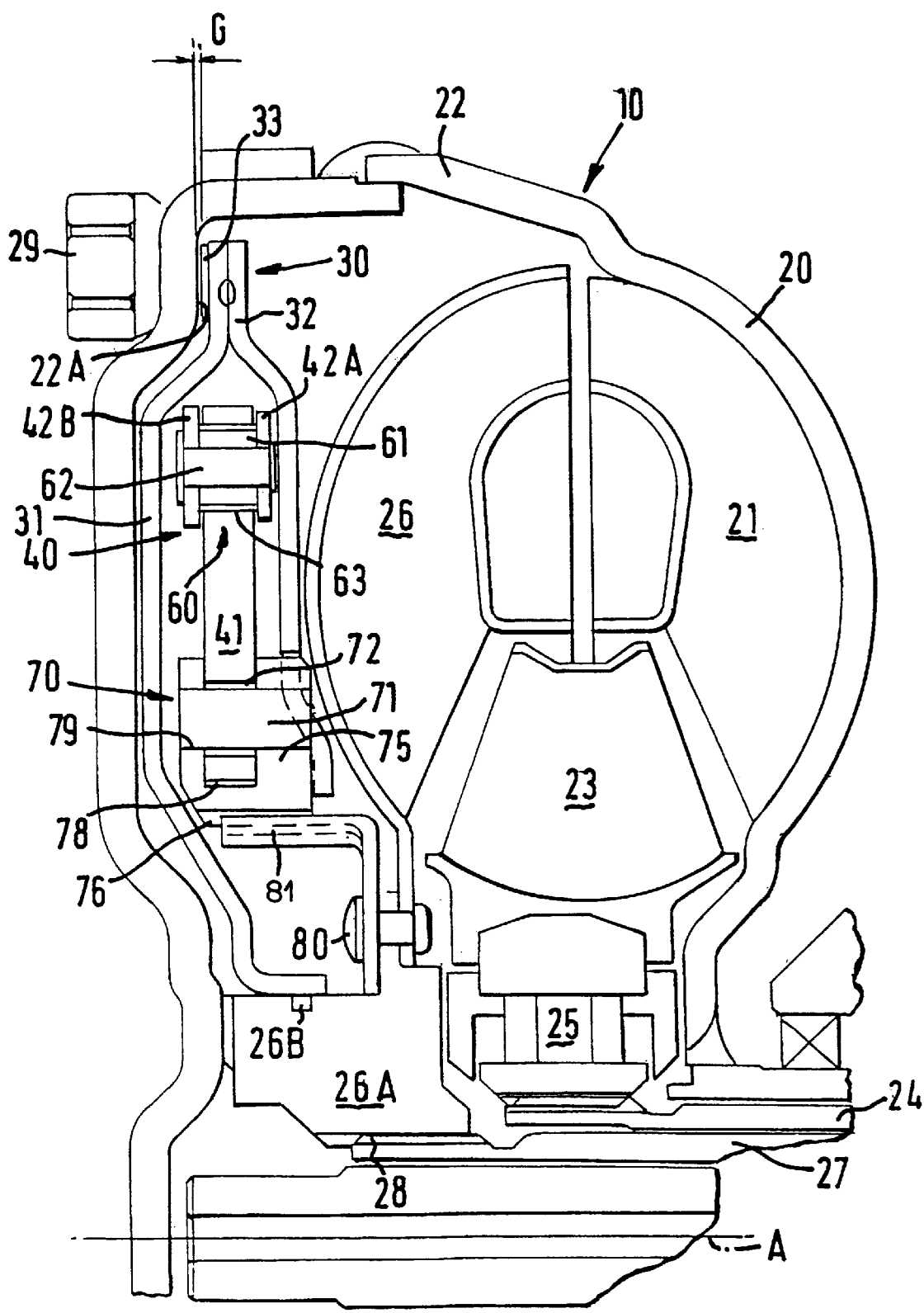
FIG. 2 is a cross-section view taken along the line X—X of FIG. 1.
Figure 3:
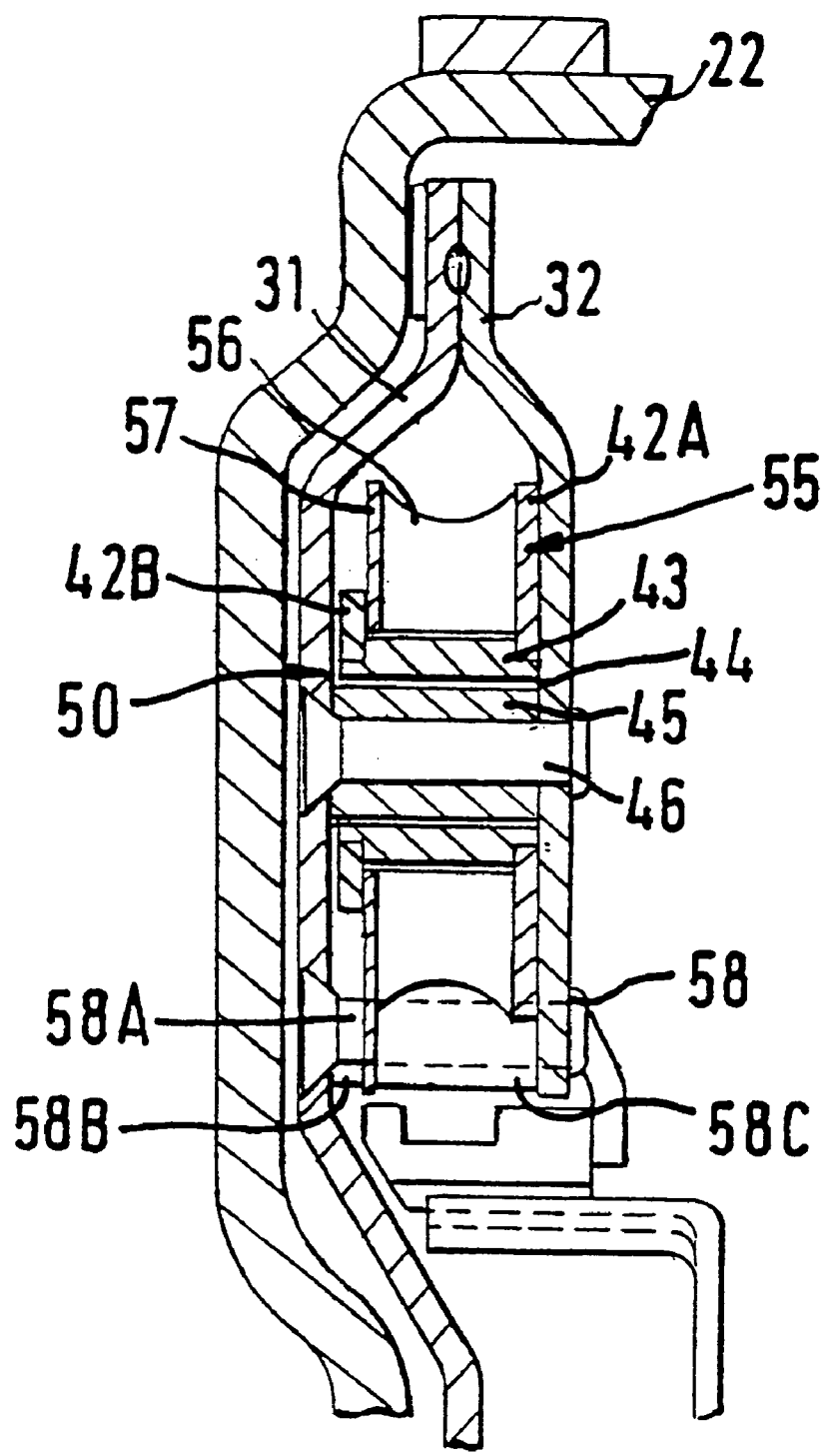
FIG. 3 is a partial cross-sectional view taken along the line Y—Y of FIG. 1.

With reference to FIGS. 1 to 3 there is shown a power transmitting arrangement 10 which includes a fluid coupling 20 a clutch 30 and a plurality of linkage arrangements 40 (only one shown) spaced circumferentially around the power transmitting arrangement.

The fluid coupling 20 comprises an impeller 21 secured to a rotatable housing 22, a stator 23 which is linked to a stationary member 24 by way of a sprag clutch 25 which allows the stator to free wheel during conditions of over-run, for example when the road wheels of a vehicle incorporating the power transmitting arrangement would otherwise be driving the engine, and a turbine 26 which transmits torque to the transmission input shaft 27 by way of a turbine hub 26A and a splined drive 28.

Power is transmitted from the impeller 21 to the turbine 26 via the circulation of fluid in a manner well known in the art.

Note that fluid coupling 20 is known as a torque converter fluid coupling. However further embodiments of the invention could use other types of fluid couplings such as a non-torque converting fluid coupling.

The housing 22 is connected for rotation with a crankshaft (not shown) of an associated engine by way of a plate (not shown). The plate is secured to the housing 22 via bolts (not shown) threaded into the nuts 29.

Thus it is possible to transmit power from the crankshaft of the engine to the input means of the impeller (e.g. housing 22) through the impeller and turbine to the output means of the turbine (e.g. the turbine hub) to the input shaft of the gearbox.

The engageable clutch 30 consists of two side plates 31,32 and a friction facing 33. When the clutch 10 is disengaged there is a gap G between the friction facing 33 and a friction surface 22A of the housing 22. Movement of the clutch 30 to the left (when viewing FIG. 2) engages the friction facing 33 with the friction surface 22A of the housing 22. When engaged, the clutch 10 rotates at the same speed as the housing 22.

The radially inner portion of the side plate 31 is formed in an axial direction and contacts a seal 26B mounted on the turbine hub 26A to ensure no passage of fluid occurs between the side plate 31 and the turbine hub 26A.

Side plates 31 and 32 act as input means for the linkage arrangement 40. Each linkage arrangement consists of two links, a main link 41 and an anchor link 42. In this embodiment the anchor link consists of a pair of anchor link plates 42A and 42B which move in unison but in further embodiments the anchor link could comprise of only a single plate.

The main link is pivotally connected to the anchor link by a pivot 60 and is also pivotally connected to a linkage hub 75 by a pivot 70. The anchor link is also pivotally connected to the side plates 31, 32 by a pivot 50.

Pivot 50 comprises a shouldered tube 43 which has a friction reducing bush 44 press fitted into its internal diameter. The anchor link plates 42A, 42B each have a hole which is press fitted onto an outer diameter of respective ends of the tube 43. The pivot 50 further comprises a hollow pin 45 which is held rotationally fast between the side plates 31 and 32 by rivet 46 with the shouldered tube 43 and bush 44 being able to rotate about the hollow pin 45.

Additionally associated with pivot 50 there is a controlling means 55 which controls the rotation of the anchor link 42 (and in particular anchor link plate 42A) relative to the side plates 31, 32. This controlling means is in the form of a disc of elastomeric material 56 which is bonded on one axial side to the anchor link plate 42A and is bonded on the other axial side to a plate 57. Both plate 57 and the disc of elastomeric material 56 have a central hole which is a clearance fit on the outside diameter of the shouldered tube 43. Plate 57 is fixed rotationally fast to side plates 31, 32 by rivets 58 passing through holes 58A and hollow spacers 58B and 58C and is additionally held rotationally fast within plate 31 via rivet 59 passing through hole 59A. Any rotation of anchor link plate 42A relative to side plate 31 causes the elastomeric material to be wound up in torsion. Anchor link plate 42B moves in unison with anchor link plate 42A and ensures pivots 50 and 60 are loaded evenly.

Pivot 60 comprises a hollow pin 61 which is clamped between the anchor link plates 42A, 42B by rivet 62 which pass through the hollow pin 61 and through holes in anchor link plates 42A, 42B. The pivot also comprises a friction reducing bush 63 which is press fitted into a hole in the main link 41. Thus bush 63 and main link 41 can rotate in unison about hollow pin 61

The linkage hub 75 is annular in shape and has a splined tooth form 76 on its inner periphery. On the outer periphery of the linkage hub 75 are circumferentially spaced lobes 77 (only one shown). Each lobe has a circumferential groove 78 which accepts a portion of an associated main link 41. Each lobe 77 has an axial hole 79. The pivot 70 comprises a pin 71 which is a press fit in the hole 79. The pin 71 also passes through a friction reducing bush 72. The bush 72 is a press fit in a hole in the main link 41. Thus main link 41 and bush 72 are able to rotate in unison about pin 71.

The spline tooth form 76 of the linkage hub 75 engages rotationally fast axially slidably with spline drive 81. Spline drive 81 is rotationally fast (via rivet 80) with the turbine hub 26A.

Operation of the power transmitting arrangment in an associated vehicle is as follows:

With the associated engine running, and a gear ratio of the associated gearbox selected with the associated vehicle stationary or travelling at low speed the clutch 30 remains disengaged. The hydraulic fluid within the housing 22 is driven via the impeller 21 and tends to rotate the turbine 26. Depending on various operating parameters of the associated vehicle the turbine 26 will rotate at a speed somewhat less than the speed of the impeller 21 i.e. the fluid coupling 20 will slip. If certain pre-determined conditions are met for example when the speed, of the turbine 26 is only marginally slower than the speed of the impeller 21 the hydraulic fluid in the region of the housing 22 to the left of side plate 31 (as viewed in FIG. 2) is allowed to evacuate to a reservoir. The resultant higher pressure acting on the right hand side of side plate 31 (as viewed in FIG. 2) causes the side plates 31, 32, linkage arrangement 40 and linkage hub 75 to move to the left, closing gap G and engaging the clutch 30. Power is now also capable of being transmitted from the engine to the input shaft of the gearbox via the engaged clutch 30 and the linkage arrangement 40.

The linkage arrangement is able to transmit power once the clutch 10 is engaged in the following manner: Centripetal forces acting on link 41 tend to move its centre of gravity to a position radially outboard of pivot 70 i.e. to its centripetally neutral position. As the linkage arrangement is required to transmit torque the linkage hub 75 rotates relative to the clutch 30. This rotation is progressively resisted via the linkage arrangement since the link 41 moves away from, but endeavours to return to, its centripetally neutral position as the relative rotation occurs.

In addition to the controlling influence of the linkage arrangement 40, when the clutch 30 rotates relative to the linkage hub 75 the anchor link plate 42A rotates relative to the plate 57 causing the elastomeric material 56 to wind up in torsion (as previously described). The elastomeric material 56 is thus a controlling means which has a controlling influence on the relative rotation of the input means to the impeller (e.g. housing 22) and the output means from the turbine (e.g. turbine hub 26A).

In further embodiments it is possible to have controlling means mounted for example at pivot 60 or at pivot 70 which would control relative rotation of the main link 41 relative to the anchor link 42 and relative rotation of the main link 41 relative to the linkage hub 75 respectively. Such controlling means situated at pivots 60 or 70 would also control relative rotation of the impeller housing 22 relative to the turbine hub 26A.

In addition to the controlling means being made from elastomeric material they could also be made from other materials in particular metallic materials in the form of springs or a viscous damper which could use the working fluid of the fluid coupling 20 and in particular helical springs.

In some circumstances it may be advantageous to preload the controlling means, for example, with the power transmitting arrangement stationary the controlling means 55 being associated with pivot 50, and with the pivots 60, 70 and the axis A of the power transmitting arrangement aligned (see FIG. 1) the controlling means 55 could bias the anchor link 42 clockwise as viewed in FIG. 1 and this clockwise bias would be resisted by tension in link 41.

The centripetally neutral position of a linkage is defined as that position it adopts when the power transmitting arrangement is rotating but transmitting zero torque and assuming no influence-by any controlling means.

In some circumstances it may be advantageous for the controlling means to bias the linkage to a position other than the centripetally neutral position of the linkage.

The controlling means could be a friction generating device, for example, the elastomeric material 56 could be replaced with a series of interleaved friction washers biased into engagement by an axially acting resilient means, with alternate friction washers being rotationally fast with the side plate 31, and the anchor link 42. Any rotation of the side plate 31, relative to the anchor link 42 would produce friction in such a device at the surface of adjacent friction washers, which would have a controlling influence on the relative rotation of the input means to the impeller and the output means from the turbine.

It can be advantageous to design the controlling means with a certain amount of lost motion or free play prior to the controlling means starting to operate. Thus for example by arranging the holes 58A and 59A in plate 57 to be arcuate slots and ensuring the rivets 58 and 59 allow a limited amount of rotation of plate 57 relative to side plate 31 the controlling means 55 would be operable only after an initial range of relative rotation of side plates 31 relative to anchor link 42.

With reference to FIG. 4 there is shown an alternative embodiment of the power transmitting arrangement 110 similar to the power transmitting arrangement 10 with components fulfilling similar functions being labelled 100 greater. However clutch 130 (which is a cone clutch) is attached to a plate 90 which has an externally splined annular portion 91. The external splines 92 of annular portion 91 engage rotationally fast but axially slideable with splines 176. On the inner diameter of plate 90 there is located a seal 93 which ensures no passage of hydraulic fluid between plate 90 and shaft 94. When the hydraulic fluid between plate 90 and turbine 126 is pressurised, the plate 90 moves to the left and the clutch 130 engages. With the clutch 130 engaged power is transmitted from the housing 122 through the linkage arrangement 140 first and then through the clutch 130 to the turbine hub 126A.

Figure 5:
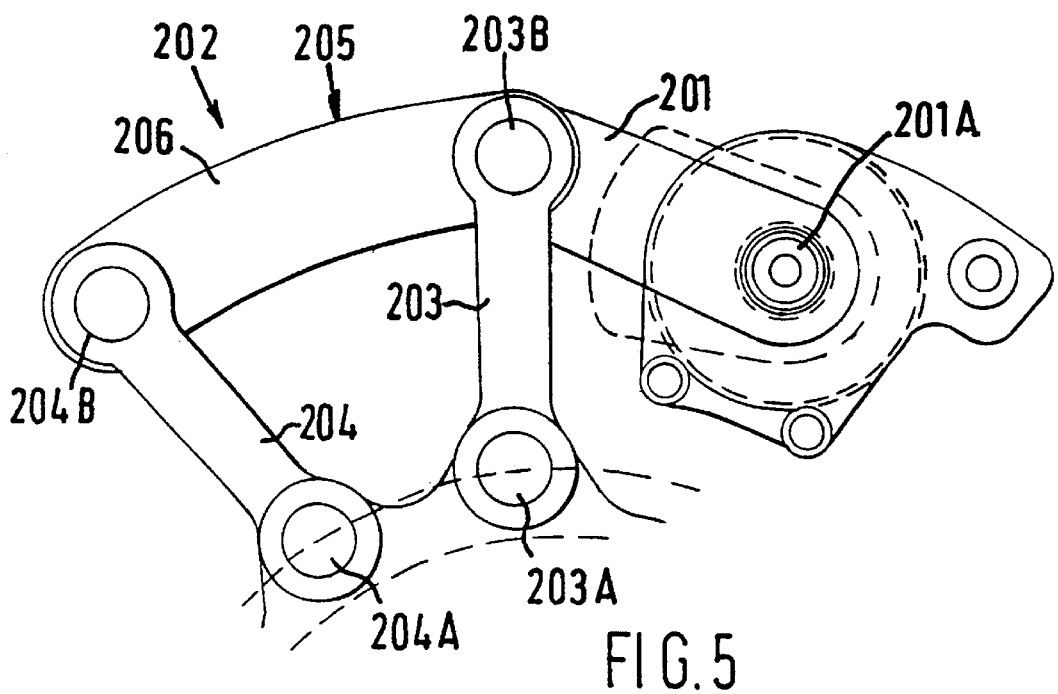
FIGS. 5 and 6 show alternative linkage arrangements which can be substituted for the linkage arrangements shown in FIGS. 1 to 3 and 4.
Figure 6:
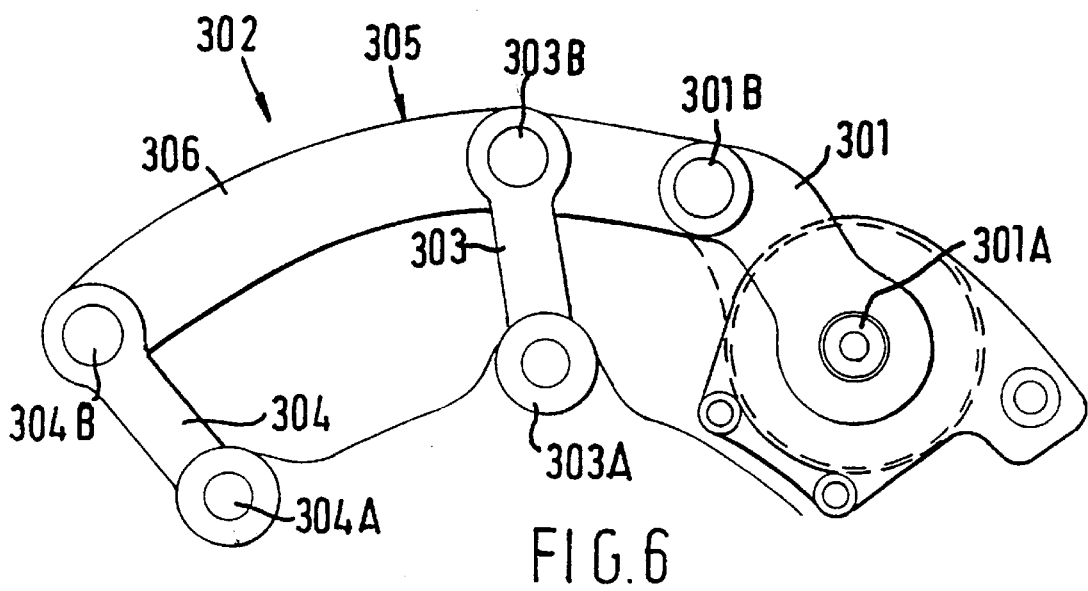

The linkage arrangement is not restricted to having just two links, for example either of the linkage arrangements shown in FIGS. 5 or 6 could be used in place of the linkage arrangements 40 or 140.

FIG. 5 shows an anchor link 201 and a multi-link linkage 202. The multi-link linkage has two circumferentially spaced main links 203, 204 pivotally mounted via respective pivots 203A, 204A on the linkage hub 75 of power transmitting arrangement 10 or on the linkage hub 175 of power transmitting arrangement 110. The main links are pivotally connected via respective pivots 203B, 204B to a generally circumferentially extending connecting linkage 205. The connecting linkage comprises link 206. The multi-link linkage 202 is connected via pivot 203B to the anchor link 201. The anchor link 201 is connected via pivot 201A to side plates 31, 32 of power transmitting arrangement 10 or to housing 122 and side plate 132 of power transmitting arrangement 110.

FIG. 6 is similar to FIG. 5 but the anchor link 301 is pivotally connected to link 306 at pivot 301B which is not coincident with pivot 303B.

The linkage arrangements are not limited to the embodiments shown in the figures and the or each linkage arrangement of the power transmitting arrangement can consist of any number of main links with an appropriate number of connecting links and an anchor link with appropriate pivotal connections such that the input and output parts of the power transmitting arrangement can rotate relative to each other and at any particular rotational position of the said input and output parts relative to each other the or each linkage arrangement is in a predictable position.

FIGS. 7 and 8 are diagrammatic respresentations of the power transmitting arrangements 10 and 110 respectively, with FC representing the fluid coupling, LA representing a linkage arrangement, C representing the clutch, E representing an associated engine and GB representing an associated gearbox. It can clearly be seen that the linkage arrangement, which can consist of at least one anchor link and main link (as shown in FIG. 1) or at least one anchor link and multi-link linkage (as shown in FIGS. 5 and 6) is in a series arrangement with the clutch and upon engagement of the clutch the input means to the impeller is connected with the output means from the turbine.

FIGS. 9 and 10 show a series arrangement of a linkage arrangement (LA) and a fluid coupling (FC) with a clutch (C) in parallel with the fluid coupling. In such an arrangement engagement of the clutch ensures no slip between the impeller and turbine of the fluid coupling. The linkage arrangement consists of at least one main link and an anchor link (as shown in FIG. 1). The linkage arrangement can comprise at least one multi-link linkage and an anchor link (as shown in FIGS. 5 and 6).

We claim:

1. A power transmitting arrangement comprising a fluid coupling and, connected in parallel with the fluid coupling, a series arrangement of a clutch and at least one linkage arrangement, the fluid coupling, linkage arrangement and clutch each having respective input and output means, and upon engagement of the clutch the series arrangement directly connecting the fluid coupling input means to the fluid coupling output means, said at least one linkage arrangement comprising at least an anchor link mounted via a pivot to one of the linkage arrangement input or output means and a main link mounted via a pivot to the other of the linkage arrangement input or output means, the anchor link and main link being connected together via a pivot so that the linkage arrangement controls the relative rotation of the input and output means of the power transmitting arrangement, when the clutch is engaged, as a result of centripetal forces acting on the links, and additional controlling means associated with a pivot at said at least one linkage arrangement for further control of the relative rotation between input and output means of the power transmitting arrangement.

2. A power transmitting arrangement as defined in claim 1 in which the linkage arrangement input means is connected to the fluid coupling input means.

3. A power transmitting arrangment as defined in claim 1 in which the clutch input means is connected to the fluid coupling input means.

4. A power transmitting arrangement as defined in claim 1 in which the controlling means is a resilient means.

5. A power transmitting arrangement as defined in claim 1 in which the controlling means consist of friction generating means.

6. A power transmitting arrangement as defined in claim 1 in which the controlling means is a viscous damper.

7. A power transmitting arrangement as defined in claim 1 in which, starting from an initial position, the controlling means only controls the rotation of the torque input means relative to the torque output means after a pre-determined amount of relative rotation.

8. A power transmitting arrangement as defined in claim 1 in which the linkage arrangement is limited in its movement by abutments on the input means side of the linkage arrangement contacting abutments on the output means side of the linkage arrangement.

9. A power transmitting arrangement as defined in claim 1 in which the clutch is a cone clutch.

10. A power transmitting arrangement comprising a fluid coupling, and connected in parallel with the fluid coupling, a series arrangement of a clutch and at least one linkage arrangement, the fluid coupling linkage arrangement and clutch each having respective input and output means, and upon engagement of the clutch the series arrangement directly connecting the fluid coupling input means to the fluid coupling output means, said at least one linkage arrangement comprising an anchor link mounted via a pivot to one of the linkage arrangement input means or output means and a multi-link linkage having two or more circumferentially spaced main links mounted via respective pivots to the other of the linkage arrangement input means or output means with each main link being connected via a respective pivot to a generally circumferentially extending connecting linkage, the multi-link linkage being connected via at least one pivot with the anchor link, so that the linkage arrangement controls the relative rotation of the input and output means of the power transmitting arrangement, when the clutch is engaged, as a result of centripetal forces acting on the links.

11. A power transmitting arrangement as defined in claim 2 in which the power transmitting arrangement further includes an additional controlling means associated with a pivot of the linkage arrangement for further control of the relative rotation between the input and output means of the power transmitting arrangement.

12. A power transmitting arrangement comprising a series arrangement of at least one linkage arrangement and a fluid coupling, all having respective input and output means, said at least one linkage arrangement comprising at least an anchor link mounted via a pivot to one of the linkage arrangement input or output means and a main link mounted via a pivot to the other of the linkage arrangement input or output means, the anchor link and main link being connected together via a pivot, the power transmitting arrangement further comprising an engageable clutch having input and output means connected to the fluid coupling input and output means respectively so that with the clutch engaged no slip occurs between the fluid coupling input and output means and the linkage arrangement controls relative rotation between the input and output means of the power transmitting arrangement as a result of centripetal forces acting upon the links, an additional controlling means associated with a pivot of said a least one linkage arrangement for further control of the relative rotation of the input and output means of the power transmitting arrangement.

13. A power transmitting arrangement as defined in claim 5 in which the linkage arrangement output means is connected to the fluid coupling input means.

14. A power transmitting arrangement as defined in claim 5 in which the fluid coupling output means is connected to the linkage arrangement input means.

15. A power transmitting arrangement as defined in claim 5 in which the controlling means is a resilient means.

16. A power transmitting arrangement as define in claim 5 in which the controlling means consist of friction generating means.

17. A power transmitting arrangement as defined in claim 5 in which the controlling means is a viscous damper.

18. A power transmitting arrangement as defined in claim 5 in which, starting from an initial position, the controlling means only controls the rotation of the torque input means relative to the torque output means after a pre-determined amount of relative rotation.

19. A power transmitting arrangement as defined in claim 5 in which the linkage arrangement is limited in its movement by abutments on the input means side of the linkage arrangement contacting abutments on the output means side of the linkage arrangement.

20. A power transmitting arrangement as defined in claim 5 in which the clutch is a cone clutch.

21. A power transmitting arrangement comprising a series arrangement of at least one linkage arrangement and a fluid coupling, all having respective input and output means, said at least one linkage arrangement comprising an anchor link mounted via a pivot to one of the linkage arrangement input or output means and a multi link linkage having two or more circumferentially spaced main links each mounted via respective pivots to the other of the linkage arrangment input or output means with each main link being connected via a respective pivot to a generally circumferentially extending connecting linkage, the multi-link linkage being connected via at least one pivot with the anchor link, the power transmitting arrangement further comprising an engageable clutch having input and output means connected to the fluid coupling input and output means respectively so that with the clutch engaged no slip occurs between the fluid coupling input and output means and the linkage arrangement controls relative rotation between the input and output means of the power transmitting arrangement as a result of centripetal forces acting on the links.

22. A power transmitting arrangement as defined in claim 11 in which the resilient means consists of an elastomeric material loaded in compression and/or torsion.

23. A power transmitting arrangement as defined in claim 11 in which the resilient means consists of a metallic spring.

24. A power transmitting arrangement as defined in claim 11 in which the resilient means is pre-loaded.

25. A power transmitting arrangement as defined in claim 11 in which the resilient means biases the linkage to a position other than its centripetally neutral position.

26. A power transmitting arrangement as defined in claim 17 in which the viscous damper utilises the working fluid of the fluid coupling.

27. A power transmitting arrangment as defined in claim 20 in which resilient means acts between the abutments.

28. A power transmitting arrangement as defined in claim 24 in which the resilient means consists of an elastomeric material loaded in compression and/or torsion.

29. A power transmitting arrangement as defined in claim 24 in which the resilient means consists of a metallic spring.

30. A power transmitting arrangement as define in claim 24 in which the resilient means is pre-loaded.

31. A power transmitting arrangement as defined in claim 24 in which the resilient means biases the linkage to a position other than its centripetally neutral position.

32. A power transmitting arrangement as defined in claim 30 in which the viscous damper utilities the working fluid of the fluid coupling.

33. A power transmitting arrangement as defined in claim 19 in which resilient means acts between the abutments.

* * * * *